United States Patent
Johnson

(10) Patent No.: US 9,429,260 B2
(45) Date of Patent: Aug. 30, 2016

(54) PNEUMATIC COUPLING SYSTEM AND METHOD

(76) Inventor: Gregory M. Johnson, Richfield, MN (US)

( * ) Notice: Subject to any disclaimer, the term of this patent is extended or adjusted under 35 U.S.C. 154(b) by 984 days.

(21) Appl. No.: 13/469,430

(22) Filed: May 11, 2012

(65) Prior Publication Data

US 2013/0299025 A1   Nov. 14, 2013

(51) Int. Cl.
  *F16L 17/02*   (2006.01)
  *F16L 29/02*   (2006.01)

(52) U.S. Cl.
  CPC .............. *F16L 29/02* (2013.01); *F16L 17/02* (2013.01); *Y10T 137/0402* (2015.04); *Y10T 137/9029* (2015.04)

(58) Field of Classification Search
  CPC ......... F16L 29/00; F16L 29/02; F16L 17/02; F16L 17/03; F16L 17/025; F16L 17/00; F16L 17/035; F16K 5/0626
  USPC ........... 251/152, 148, 150; 285/109, 97, 100
  See application file for complete search history.

(56) References Cited

U.S. PATENT DOCUMENTS

| | | | | |
|---|---|---|---|---|
| 1,861,211 A | * | 5/1932 | Gammeter | 285/106 |
| 2,184,376 A | * | 12/1939 | Beyer et al. | 285/105 |
| 2,209,235 A | * | 7/1940 | Nathan | 277/626 |
| 2,538,683 A | * | 1/1951 | Guiler et al. | 277/626 |
| 3,363,912 A | * | 1/1968 | Holloway | 277/607 |
| 4,629,217 A | * | 12/1986 | Straub | 285/112 |
| 5,360,036 A | * | 11/1994 | Kieper | F16K 5/0605 137/315.18 |
| 2009/0032757 A1 | * | 2/2009 | Maruyama et al. | 251/150 |

\* cited by examiner

*Primary Examiner* — John K Fristoe, Jr.
*Assistant Examiner* — Andrew J Rost
(74) *Attorney, Agent, or Firm* — Martin Jerisat; Kader Gacem

(57) ABSTRACT

Disclosed herein is a fluid coupling system and method. The system may include a supply bladder, a discharge bladder, and a ball valve. The supply bladder having a supply inflation portion, the supply housing having a supply inflation passage that provides fluid communication between a central fluid passage and the supply inflation portion, the discharge bladder having a discharge inflation portion, and the ball valve secured in the supply housing or the discharge housing, wherein the discharge inflation portion may be placed in fluid communication with the central fluid passage by twisting the supply housing while the discharge housing remains stationary, and wherein the ball valve may block the central fluid passage while in a first position and may open a fluid passage through the supply housing and the discharge housing while in a second position.

15 Claims, 3 Drawing Sheets

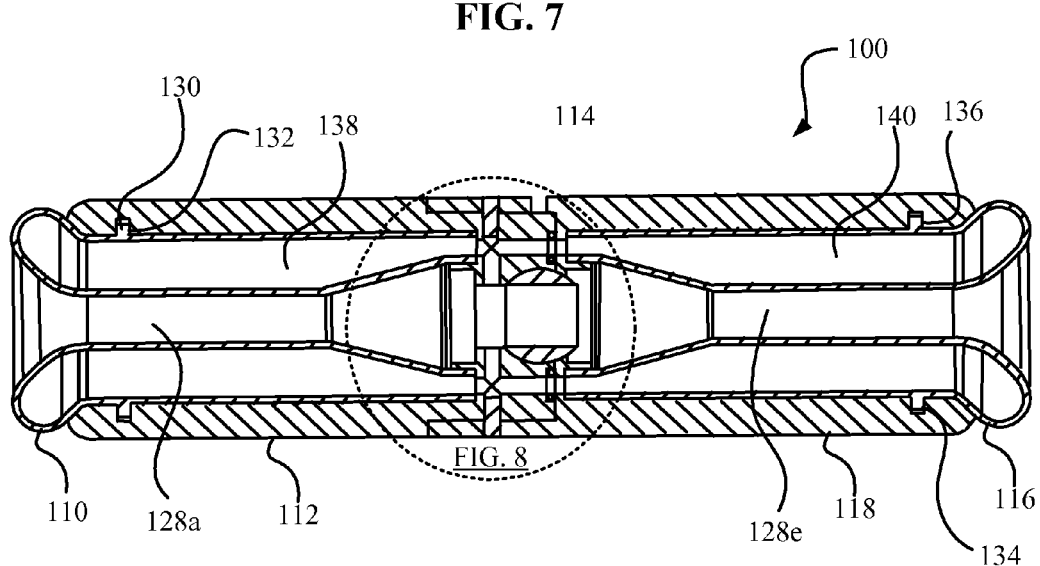
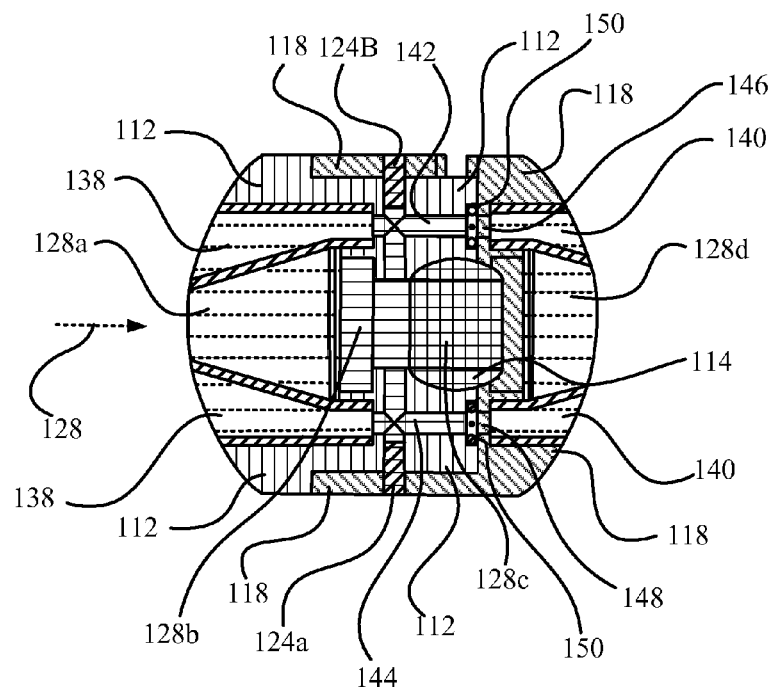

PNEUMATIC COUPLING SYSTEM AND METHOD

BACKGROUND

1. Field

This invention is generally related to pneumatic systems and methods, and more particularly to a fluid coupling system and method.

2. Background

Fluid pressure, such as but not limited to, pneumatic pressure, is often used for various applications, including as a motive force for a tool, such as a nail gun. The fluid pressure is often generated by a compressor and passed through a conduit system. The conduit system may include conduit, such as hosing and tubing, and various fittings for controlling the flow of the fluid through the conduit system. It is generally beneficial to have a means for quickly connecting and disconnecting the conduit, while minimizing the leakage of fluid through the conduit system, and while maintaining an optimal and efficient flow of fluid through the conduit system. However, the current conduit systems, due to the limitations of the current fluid coupling systems and methods, fail to provide an optimum system and method for quickly connecting and disconnecting the conduit, while minimizing the leakage of fluid through the conduit system, and while maintaining an optimal and efficient flow of fluid through the conduit system. Therefore, there is a need for a more efficient fluid coupling systems and method.

SUMMARY

Disclosed herein is a new and improved fluid coupling system and method. In accordance with one aspect of the approach, the fluid coupling system may include a supply bladder, a discharge bladder, and a valve, the supply bladder having a supply inflation portion partially enclosed within a supply housing, the supply housing having a supply inflation passage that provides fluid communication between a central fluid passage and the supply inflation portion, the discharge bladder having a discharge inflation portion partially enclosed within a discharge housing, and the valve secured in the supply housing or the discharge housing, wherein the discharge inflation portion may be isolated from the central fluid passage in a first position, and be placed in fluid communication with the central fluid passage by twisting the supply housing while the discharge housing remains stationary, and wherein the valve may block the central fluid passage while in a first position and may open a fluid passage through the supply housing and the discharge housing while in a second position. One of the advantages of the present invention is the ability to seal hoses inside bladders and connect two hoses together. Other advantages are provided in the disclosure.

Other systems, methods, aspects, features, embodiments and advantages of the fluid coupling system and method disclosed herein will be, or will become, apparent to one having ordinary skill in the art upon examination of the following drawings and detailed description. It is intended that all such additional systems, methods, aspects, features, embodiments and advantages be included within this description, and be within the scope of the accompanying claims.

BRIEF DESCRIPTION OF THE DRAWINGS

It is to be understood that the drawings are solely for purpose of illustration. Furthermore, the components in the figures are not necessarily to scale, emphasis instead being placed upon illustrating the principles of the system disclosed herein. In the figures, like reference numerals designate corresponding parts throughout the different views.

FIG. 7 shows a cut-away view of the coupler of FIG. 1 from a section line shown in FIG. 3.

FIG. 8 shows an enlarged central portion of the cut-away view of the coupler of FIG. 7.

DETAILED DESCRIPTION

The following detailed description, which references to and incorporates the drawings, describes and illustrates one or more specific embodiments. These embodiments, offered not to limit but only to exemplify and teach, are shown and described in sufficient detail to enable those skilled in the art to practice what is claimed. Thus, for the sake of brevity, the description may omit certain information known to those of skill in the art.

Figure 1:
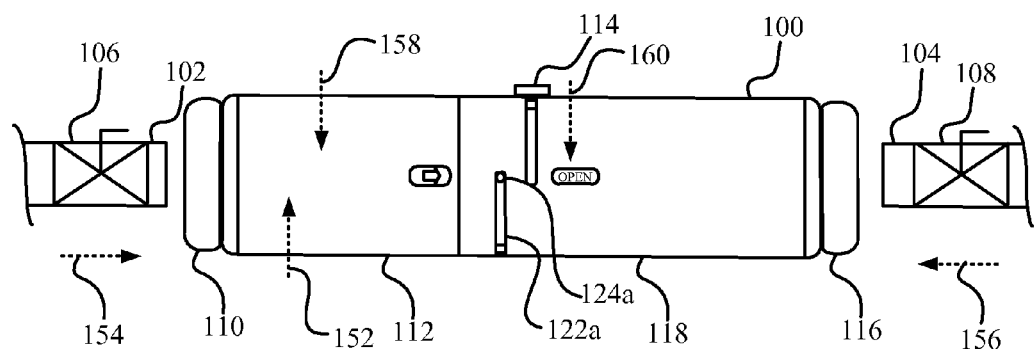
FIG. 1 is a front view of an exemplary fluid coupler between a supply conduit and a discharge conduit.

FIG. 1 shows a front view of an exemplary fluid coupler 100 between a supply conduit 102 and a discharge conduit 104. The supply conduit 102 may be connected to a supply valve 106. The supply valve 106 may be connected, either directly or through various fluid fittings (not shown) to a fluid pressure source (not shown), such as but not limited to, a compressor (not shown). Discharge conduit 104 may be connected to a discharge side valve 108. Discharge side valve 108 may be connected, either directly or through various fluid fitting (not shown) to a fluid pressurized tool (not shown), such as but not limited to, a nail gun (not shown).

Figure 5:
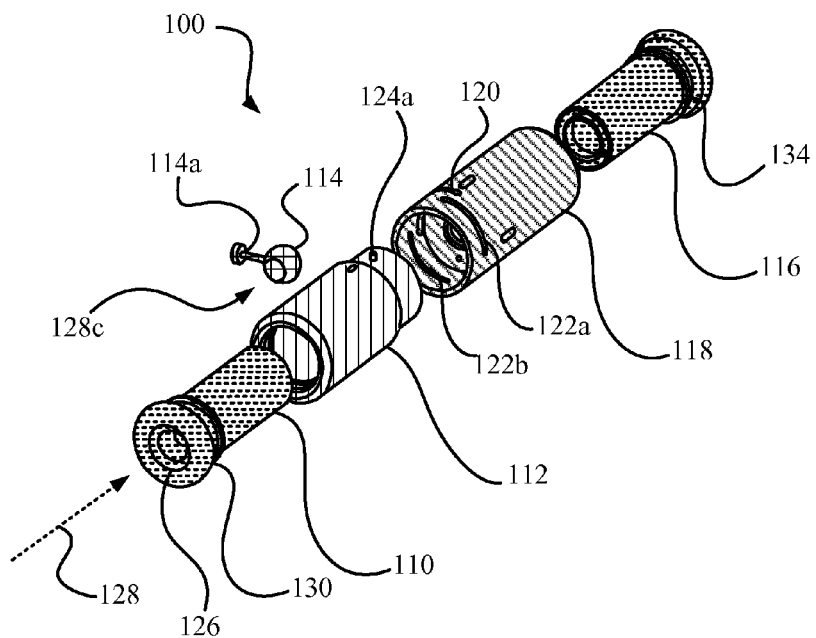
FIG. 5 is an exploded view of the fluid coupler of FIG. 1.

Coupler 100 may include a supply bladder 110, a supply housing 112, a valve 114 (a more complete view of valve 114 is shown in FIG. 5), which may be in the form of a ball, a discharge bladder 116, and a discharge housing 118. Discharge housing 118 may include a ball valve arm slot 120, a first housing alignment slot 122a and a second housing alignment slot 122b (see FIG. 2). Supply housing 112 may include a first alignment pin 124a and a second alignment pin 124b (see FIG. 2).

Figure 2:
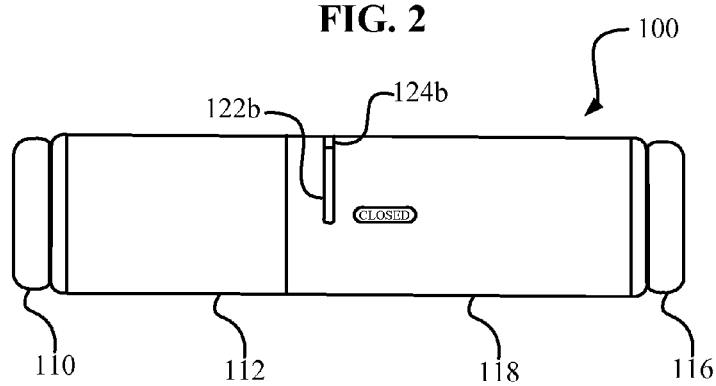
FIG. 2 is a rear view of the fluid coupler of FIG. 1.

FIG. 2 shows a rear view of fluid coupler 100 in a closed position.

Figure 3:
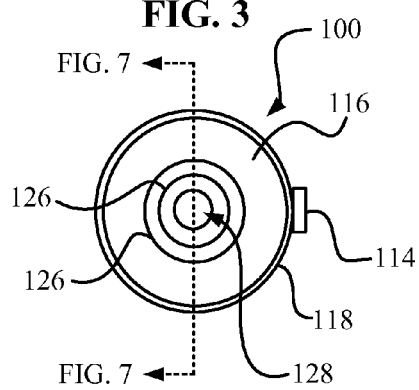
FIG. 3 is a discharge-side end-view of the fluid coupler of FIG. 1 with the orientation of the coupler 100 as shown in FIG. 2

FIG. 3 shows a discharge-side end-view of the fluid coupler 100 with the orientation of coupler 100 as shown in FIG. 2 (i.e., with the front of coupler 100 on the right side of FIG. 3). As can be seen in FIG. 3, discharge bladder 116 may include a plurality of concentric ridges 126 surrounding a fluid passage 128 formed, in part, by discharge bladder 116. A plurality of concentric ridges 126 may also be provided on a supply bladder (not shown).

Figure 4:
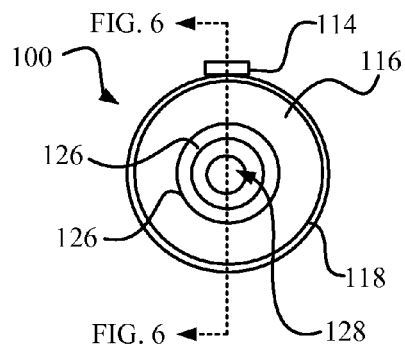
FIG. 4 is a discharge side end-view of the fluid coupler of FIG. 1 with the orientation of the coupler as shown in FIG. 1.

FIG. 4 shows a discharge side end view of fluid coupler 100 with the orientation of coupler 100 as shown in FIG. 1 (with the front of coupler 100 on the left side of FIG. 4).

FIG. 5 shows an exploded view of fluid coupler 100.

Figure 6:
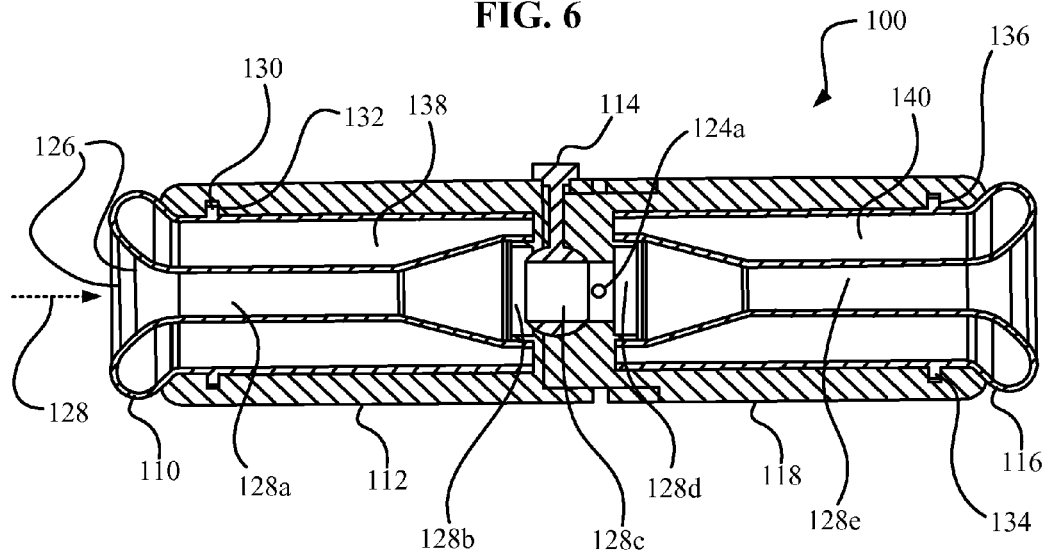
FIG. 6 is a cut-away view of the coupler of FIG. 1 from a section line as shown in FIG. 4.

FIG. 6 shows a cut-away view of coupler 100 from a section line as shown in FIG. 4. As can be seen in FIG. 6, fluid passage 128 runs throughout coupler 100 and is formed by fluid passage portion 128a of supply bladder 110, a fluid passage portion 128b of supply housing 112, a fluid passage portion 128c of valve 114, a fluid passage portion 128d of discharge housing 118, and a fluid passage portion 128e of discharge bladder 116.

Supply bladder 110 may include a supply shoulder ridge 130 that sits within a supply shoulder seat 132 portion of supply housing 112. Discharge bladder 116 may include a discharge shoulder ridge 134 that sits within a discharge shoulder seat 136 portion of discharge housing 118. Supply bladder 110 may include a supply inflation portion 138. Discharge bladder 116 may include a discharge inflation portion 140.

FIG. 7 shows a cut-away view of the coupler 100 from a section line as shown in FIG. 3. FIG. 8 shows an enlarged central portion of the cut-away view of coupler 100 of FIG. 7. FIG. 8 shows that supply housing 112 may include a front supply inflation passage 142 and a rear supply inflation passage 144, and discharge housing 118 may include a front discharge inflation passage 146 and a rear discharge inflation passage 148. Coupling 100 may also include O-rings 150.

In operation, coupler 100 may initially be placed in a closed position (as shown in FIG. 1) by twisting supply housing 112 in the direction of arrow 152 while discharge housing 118 remains stationary, and while maintaining valve 114 in a closed position (as shown in FIG. 1). Supply valve 106 may be closed while supply conduit 104 is moved in the direction of arrow 154 and pressed against supply bladder 110 near the plurality of concentric ridges 126. Opening supply valve 106 may then permit compressed fluid, for example but not limited to, compressed air to flow into supply inflation portion 138 of supply bladder 110 by passing through fluid passage portion 128a, fluid passage portion 128b, fluid passage portion 128c, front supply inflation passage 142, and rear supply inflation passage 144. Inflating supply inflation portion 138 may cause supply bladder 110 to seal and secure supply conduit 102 against supply bladder 110 near the plurality of concentric ridges 126. Initially, discharge inflation portion 140 of discharge bladder 116 may remain isolated from the compressed air due to the intended misalignment of front and rear discharge inflation passages 146, 148 from front supply inflation portion 142, and front and rear supply inflation passages 142, 144, respectively.

After supply conduit 102 is secured to supply bladder 110 by the inflation of supply inflation portion 138, discharge conduit 104 may be moved in the direction of arrow 156 and pressed against supply bladder 116 near the plurality of concentric ridges 126. Twisting supply 112 housing in the direction of arrow 158 while discharge housing 118 remains stationary may then cause front and rear discharge inflation passage 146 and 148 to align with front and rear supply inflation passage 142 and 144. The compressed air may then flow to discharge inflation portion 140 of discharge bladder 116. Inflating discharge inflation portion 140 may cause discharge bladder 116 to seal and secure discharge conduit 104 against discharge bladder 116 near the plurality of concentric ridges 126. Turning the stem 114a of ball valve 114 in the direction of arrow 160 may then complete the opening of the fluid passage 128 from supply conduit 102 to discharge conduit 104. As such two houses may be sealed inside bladders, and the two houses may be coupled together in this way.

The word "exemplary" is used herein to mean "serving as an example, instance, or illustration." Any embodiment or variant described herein as "exemplary" is not necessarily to be construed as preferred or advantageous over other embodiments or variants. All of the embodiments and variants described in this description are exemplary embodiments and variants provided to enable persons skilled in the art to make and use the invention, and not necessarily to limit the scope of legal protection afforded the appended claims.

The above description of the disclosed embodiments is provided to enable any person skilled in the art to make or use that, which is defined by the appended claims. The following claims are not intended to be limited to the disclosed embodiments. Other embodiments and modifications will readily occur to those of ordinary skill in the art in view of these teachings. Therefore, the following claims are intended to cover all such embodiments and modifications when viewed in conjunction with the above specification and accompanying drawings.

What is claimed is:

1. A method for coupling at least one supply conduit and at least one discharge conduit, the method comprising the steps of:
   a. Providing a supply housing having a supply bladder adapted to receive the supply conduit, and a supply inflation passage that provides fluid communication between a fluid passage and a supply inflation portion that is partially enclosed in the supply housing;
   b. Providing a discharge housing having a discharge bladder, which has a discharge inflation portion and is adapted to receive the discharge conduit, wherein the discharge inflation portion is isolated from the fluid passage in a first housing position and placed in fluid communication with the fluid passage in a second housing position by twisting the supply housing in relation to the discharge housing to the second housing position;
   c. Inflating the supply bladder to secure the supply conduit inside the supply housing;
   d. Inflating the discharge bladder to secure the discharge conduit inside the discharge housing; and
   e. Opening a flow controller that is secured in the discharge housing to fluidly connect the supply conduit with the discharge conduit, wherein the flow controller may block the fluid passage while in a first controller position and open the fluid passage through the supply housing and the discharge housing while in a second controller position.

2. The method of claim 1 where in the step of inflating the supply bladder includes using a fluid from the supply conduit.

3. The method of claim 1 where in the step of inflating the discharge bladder includes using a fluid from the discharge conduit.

4. The method of claim 1 wherein the step of opening a flow controller includes moving a stem of the flow controller from a first position to a second position.

5. The method of claim 1, wherein the discharge inflation portion is placed in fluid communication with the fluid passage only through a connection to the supply inflation portion.

6. A fluid coupling system comprising:
   a supply bladder having a supply inflation portion partially enclosed within a supply housing, the supply housing having a supply inflation passage that provides fluid communication between a fluid passage and the supply inflation portion;

a discharge bladder having a discharge inflation portion partially enclosed within a discharge housing;

a flow controller;

wherein the discharge inflation portion may be isolated from the fluid passage in a first housing position and be placed in fluid communication with the fluid passage in a second housing position by twisting the supply housing in relation to the discharge housing to the second housing position, and wherein the flow controller may block the fluid passage while in a first controller position and may open a fluid passage through the supply housing and the discharge housing while in a second controller position.

7. The system of claim 1 wherein the flow controller is secured in the discharge housing.

8. The system of claim 1 wherein the supply bladder is adapted to receive and secure a supply conduit.

9. The system of claim 8 wherein the discharge bladder is adapted to receive and secure a discharge conduit.

10. The system of claim 9 wherein the supply conduit is fluidly communicating with the discharge conduit when the flow controller moves from the first controller position to the second controller position.

11. A coupling system comprising:

a supply means having a supply inflation means portion partially enclosed within a supply housing, the supply housing having a supply inflation passage means that provides fluid communication between at least one fluid passage and the supply inflation means portion;

a discharge bladder means having a discharge inflation means portion partially enclosed within a discharge housing;

a flow control means;

wherein the discharge inflation means portion may be isolated from the fluid passage in a first housing position and be placed in fluid communication with the fluid passage in a second housing position by twisting the supply housing in relation to the discharge housing to the second housing position, and wherein the flow control means blocks the fluid passage while in a first controller position and opens a fluid passage through the supply housing and the discharge housing while in a second controller position.

12. The system of claim 11 wherein the flow control means is secured in the discharge housing.

13. The system of claim 11 wherein the supply bladder means is adapted to receive and secure a supply conduit means.

14. The system of claim 13 wherein the discharge bladder means is adapted to receive and secure a discharge conduit means.

15. The system of claim 14 wherein the supply conduit means is fluidly communicating with the discharge conduit means when the fluid control means moves from the first controller position to the second controller position.

* * * * *